US010393093B2

(12) United States Patent
Gregg et al.

(10) Patent No.: US 10,393,093 B2
(45) Date of Patent: Aug. 27, 2019

(54) SYSTEM AND METHOD FOR ASSESSING THE PERFORMANCE IMPACT OF WIND TURBINE UPGRADES

(71) Applicant: General Electric Company, Schenectady, NY (US)

(72) Inventors: Peter Alan Gregg, Niskayuna, NY (US); John D. Hilton, Jr., East Greenbush, NY (US); David Charles Korim, Albany, NY (US); David William Eldridge, Schenectady, NY (US); Matthew N. Daly, Rexford, NY (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 15/036,838

(22) PCT Filed: Nov. 19, 2014

(86) PCT No.: PCT/US2014/066409
§ 371 (c)(1),
(2) Date: May 16, 2016

(87) PCT Pub. No.: WO2015/077337
PCT Pub. Date: May 28, 2015

(65) Prior Publication Data
US 2016/0298607 A1 Oct. 13, 2016

Related U.S. Application Data

(60) Provisional application No. 61/907,230, filed on Nov. 21, 2013.

(51) Int. Cl.
*F03D 7/02* (2006.01)
*F03D 9/25* (2016.01)
(Continued)

(52) U.S. Cl.
CPC .............. *F03D 17/00* (2016.05); *F03D 7/028* (2013.01); *F03D 7/0224* (2013.01); *F03D 9/257* (2017.02);
(Continued)

(58) Field of Classification Search
CPC .......... F03D 17/00; F03D 80/70; F03D 15/10; F03D 9/257; F03D 7/028; F03D 7/0224;
(Continued)

(56) References Cited

U.S. PATENT DOCUMENTS

| 7,363,808 | B2 * | 4/2008 | Ormel | G01P 5/06 73/1.29 |
| 7,941,304 | B2 * | 5/2011 | Gundling | F03D 7/043 703/6 |
| 8,258,643 | B2 * | 9/2012 | Bonnet | F03D 7/02 290/44 |
| 8,295,987 | B2 * | 10/2012 | Gadre | F03D 17/00 290/44 |
| 8,924,162 | B2 * | 12/2014 | Lapira | G06F 19/00 702/34 |

(Continued)

FOREIGN PATENT DOCUMENTS

WO    WO2011101475    * 8/2011

OTHER PUBLICATIONS

Curvers et al., "Owez Farm Efficiency", Nordzee Wind, XP002735895, Dec. 2009, 1-29.

(Continued)

*Primary Examiner* — Juan C Ochoa
(74) *Attorney, Agent, or Firm* — Dority & Manning, P.A.

(57) ABSTRACT

In one aspect, a method for assessing the performance impact of wind turbine upgrades may generally include determining a baseline power curve for a wind turbine prior to the wind turbine being upgraded and determining a baseline wind speed transfer function for the wind turbine
(Continued)

prior to the wind turbine being upgraded. The method may also include determining an upgraded wind speed transfer function for the wind turbine after the wind turbine is upgraded. In addition, the method may include determining a corrected local wind speed for the wind turbine based on the baseline and upgraded wind speed transfer functions and determining an upgraded power curve for the wind turbine based on the corrected local wind speed.

20 Claims, 10 Drawing Sheets

(51) Int. Cl.
    *F03D 15/10*     (2016.01)
    *F03D 17/00*     (2016.01)
    *F03D 80/70*     (2016.01)

(52) U.S. Cl.
    CPC .............. *F03D 15/10* (2016.05); *F03D 80/70* (2016.05); *F05B 2230/80* (2013.01); *F05B 2270/32* (2013.01); *F05B 2270/802* (2013.01); *Y02P 70/523* (2015.11)

(58) Field of Classification Search
    CPC .............. Y02P 70/523; F05B 2270/802; F05B 2270/32; F05B 2230/80
    See application file for complete search history.

(56) References Cited

U.S. PATENT DOCUMENTS 9,189,755 B2 * 11/2015 Krishna ................. G06Q 10/04
9,606,518 B2 * 3/2017 Evans ................... G05B 13/026
9,644,612 B2 * 5/2017 Evans ..................... F03D 17/00

OTHER PUBLICATIONS

Eichhorn, "The change of power curves as a function of various meteorological parameters", Faculty of Geo- and Atmospheic sciences of the university of Innsbruck, XP002735894, Sep. 2013 (Sep. 2013), pp. 1-73.
Van Der Giessen, "Wind Turbines—Part 12-2: Power performance of electricity producing wind turbines based on nacelle anemometry", International Electrotechnical Commission , XP002735896, Jul. 18, 2008.
International Search Report of PCT/US2014/066409 dated Jun. 3, 2015.

* cited by examiner

SYSTEM AND METHOD FOR ASSESSING THE PERFORMANCE IMPACT OF WIND TURBINE UPGRADES

CROSS-REFERENCE TO RELATED APPLICATIONS

The present application is based upon and claims priority to U.S. Provisional Patent Application No. 61/907,230, filed on Nov. 21, 2013, the disclosure of which is hereby incorporated by reference herein in its entirety for all purposes.

FIELD OF THE INVENTION

The present subject matter relates generally to wind turbines and, more particularly, to a system and method for assessing the performance impact of upgrades installed on and/or within a wind turbine, including hardware and/or control-related upgrades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To improve the performance of an existing wind turbine, one or more upgrades are often installed on and/or within the wind turbine. For instance, various hardware-related upgrades and/or control/software-related upgrades may be installed on and/or within a wind turbine in an attempt to increase its annual energy production (AEP). However, once a wind turbine has been upgraded, it is often difficult to assess or otherwise quantify that impact that the installed upgrade(s) has had on the wind turbine's overall performance.

Accordingly, an effective system and method for assessing the performance impact of wind turbine upgrades would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for assessing the performance impact of wind turbine upgrades. The method may generally include determining, with a computing device, a baseline power curve for a wind turbine prior to the wind turbine being upgraded and determining a baseline wind speed transfer function for the wind turbine prior to the wind turbine being upgraded, wherein the baseline wind speed transfer function relates a reference wind speed to a local wind speed for the wind turbine. The method may also include determining an upgraded wind speed transfer function for the wind turbine after the wind turbine is upgraded, wherein the upgraded wind speed transfer function relates the reference wind speed to the local wind speed for the wind turbine measured after the wind turbine is upgraded. In addition, the method may include determining a corrected local wind speed for the wind turbine based on the baseline and upgraded wind speed transfer functions and determining an upgraded power curve for the wind turbine based on the corrected local wind speed.

In another aspect, the present subject matter is directed to a method for assessing the performance impact of wind turbine upgrades. The method may generally include determining, with a computing device, a baseline power curve for a wind turbine prior to the wind turbine being upgraded and determining a baseline wind speed transfer function for the wind turbine prior to the wind turbine being upgraded using a polynomial regression analysis, wherein the baseline wind speed transfer function is defined as a baseline polynomial function relating a reference wind speed to a local wind speed for the wind turbine. The method may also include determining an upgraded wind speed transfer function for the wind turbine after the wind turbine is upgraded using a polynomial regression analysis, wherein the upgraded wind speed transfer function is defined as an upgraded polynomial function relating the reference wind speed to the local wind speed for the wind turbine measured after the wind turbine is upgraded. In addition, the method may include determining a corrected local wind speed for the wind turbine based on the baseline and upgraded polynomial functions and determining an upgraded power curve for the wind turbine based on the corrected local wind speed.

In a further aspect, the present subject matter is directed to a method for assessing the performance impact of wind turbine upgrades. The method may generally include determining, with a computing device, a baseline wind speed transfer function for a first wind turbine prior to the first wind turbine being upgraded, wherein the baseline wind speed transfer function relates a reference wind speed to a local wind speed for the first wind turbine. The method may also include determining an upgraded wind speed transfer function for the first wind turbine after the first wind turbine is upgraded, wherein the upgraded wind speed transfer function relates the reference wind speed to the local wind speed for the first wind turbine measured after the first wind turbine is upgraded. In addition, the method may include determining a baseline power curve for a second wind turbine prior to second the wind turbine being upgraded, determining a corrected local wind speed for the second wind turbine after the second wind turbine is upgraded based on the baseline and upgraded wind speed transfer functions determined for the first wind turbine and determining an upgraded power curve for the second wind turbine based on the corrected local wind speed.

In yet another aspect, the present subject matter is directed to a system for assessing the performance impact of wind turbine upgrades. In general, the system may include a controller or computing device configured to perform one or more of the method elements described above. For instance, the computing device may include one or more processors and associated memory. The memory may store instructions that, when executed by the processor(s), configure the computing device to determine a baseline power curve for a wind turbine prior to the wind turbine being upgraded and determine a baseline wind speed transfer function for the wind turbine prior to the wind turbine being upgraded, wherein the baseline wind speed transfer function relates a reference wind speed to a local wind speed for the wind turbine. The computing device may also be configured to determine an upgraded wind speed transfer function for the wind turbine after the wind turbine is upgraded, wherein the upgraded wind speed transfer function relates the reference wind speed to the local wind speed for the wind turbine measured after the wind turbine is upgraded. In addition, the computing device may be configured to determine a corrected local wind speed for the wind turbine based on the baseline and upgraded wind speed transfer functions and determine an upgraded power curve for the wind turbine based on the corrected local wind speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
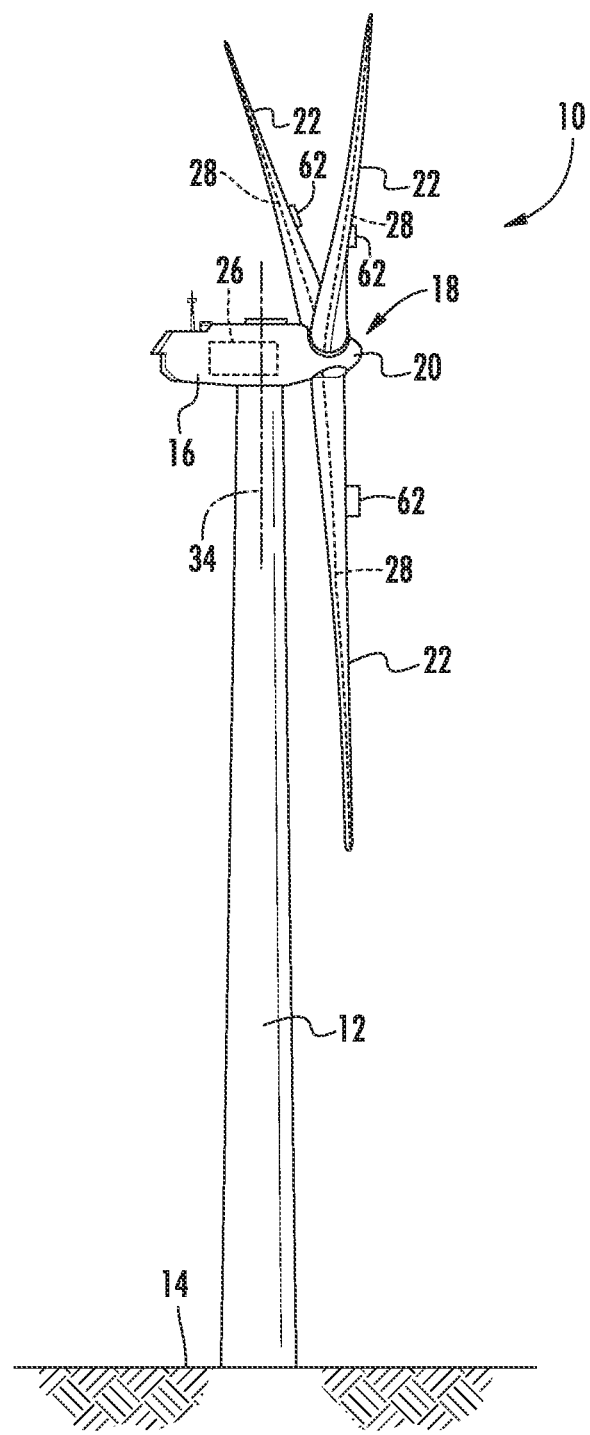
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for assessing the performance impact of upgrades installed on wind turbines. Specifically, in several embodiments, baseline data associated with the performance and operating parameters of a wind turbine may be initially determined prior to installing an upgrade(s) (e.g., a hardware-based and/or control-based upgrade(s)) on and/or within the wind turbine. For instance, a baseline power curve may be defined based on the power output of the wind turbine as a function of its local wind speed (i.e., a wind speed measured at or adjacent to the wind turbine such that the wind speed is not equal to the associated free-stream wind speed due to the presence of the wind turbine). In addition, a baseline wind speed transfer function may also be established that relates the wind turbine's local wind speed to a reference wind speed (e.g., the free-stream wind speed for the wind turbine) based on pre-upgrade wind speed measurements. Moreover, after upgrading the wind turbine, a second, upgraded wind speed transfer function may then be established that again relates the wind turbine's local wind speed to the reference wind speed based on post-upgrade wind speed measurements. Thereafter, such baseline and upgraded transfer functions may be utilized to adjust the local wind speed measurements for the wind turbine in order to account for any changes resulting from the installed upgrade(s). The adjusted local wind speed measurements may then be utilized to determine an updated power curve for the wind turbine, which may then be compared to the turbine's corresponding baseline power curve. By comparing such curves, a direct assessment may then be made of the impact of the installed upgrade(s) on the overall performance of the wind turbine. For instance, separate AEP values for the wind turbine may be calculated based on the baseline and upgraded power curves, thereby allowing for the overall increase in power production to be quantified.

It should be appreciated that, by developing the disclosed transfer functions for one or more wind turbines at a given wind turbine site, the transfer functions may then be utilized to asses the performance impact of the same or similar upgrades installed on other wind turbines located at the same site. Specifically, the transfer functions initially developed for the wind turbine(s) may then be extrapolated to the remaining wind turbines at a given site that have the same configuration and that are receiving the same or similar upgrades. Moreover, the application of the transfer functions need not be site-specific. For example, transfer functions developed for wind turbines at a first site may also be utilized to assess the same or similar upgrades installed on wind turbines of the same model type or configuration located at one or more other sites, including wind turbine sites that are significantly remote to the first site.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the controller 26 may comprise a computing device and/or any other suitable processing unit. Thus, in several embodiments, the controller 26 may include suitable computer-readable instructions that, when implemented, configure the controller 26 to perform various different functions, such as receiving, transmitting and/or executing wind turbine control signals. As such, the controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. Specifically, in several embodiments, the controller 26 may control the pitch angle of the rotor blades 22, either individually or simultaneously, by transmitting suitable control signals directly or indirectly (e.g., via a pitch controller 30 (FIG. 2)) to one or more pitch adjustment mechanisms 32 (FIG. 2) of the wind turbine 10. Similarly, the controller 26 may be configured to adjust the yaw angle of the nacelle 16 (i.e., an angle that determines a perspective of the nacelle 16 relative to the direction of the wind) about a yaw axis 34 of the wind turbine 10. For example, the controller 26 may transmit suitable control signals to one or more yaw drive mechanisms 36 (FIG. 2) of the wind turbine 10 to automatically control the yaw angle.

Figure 2:
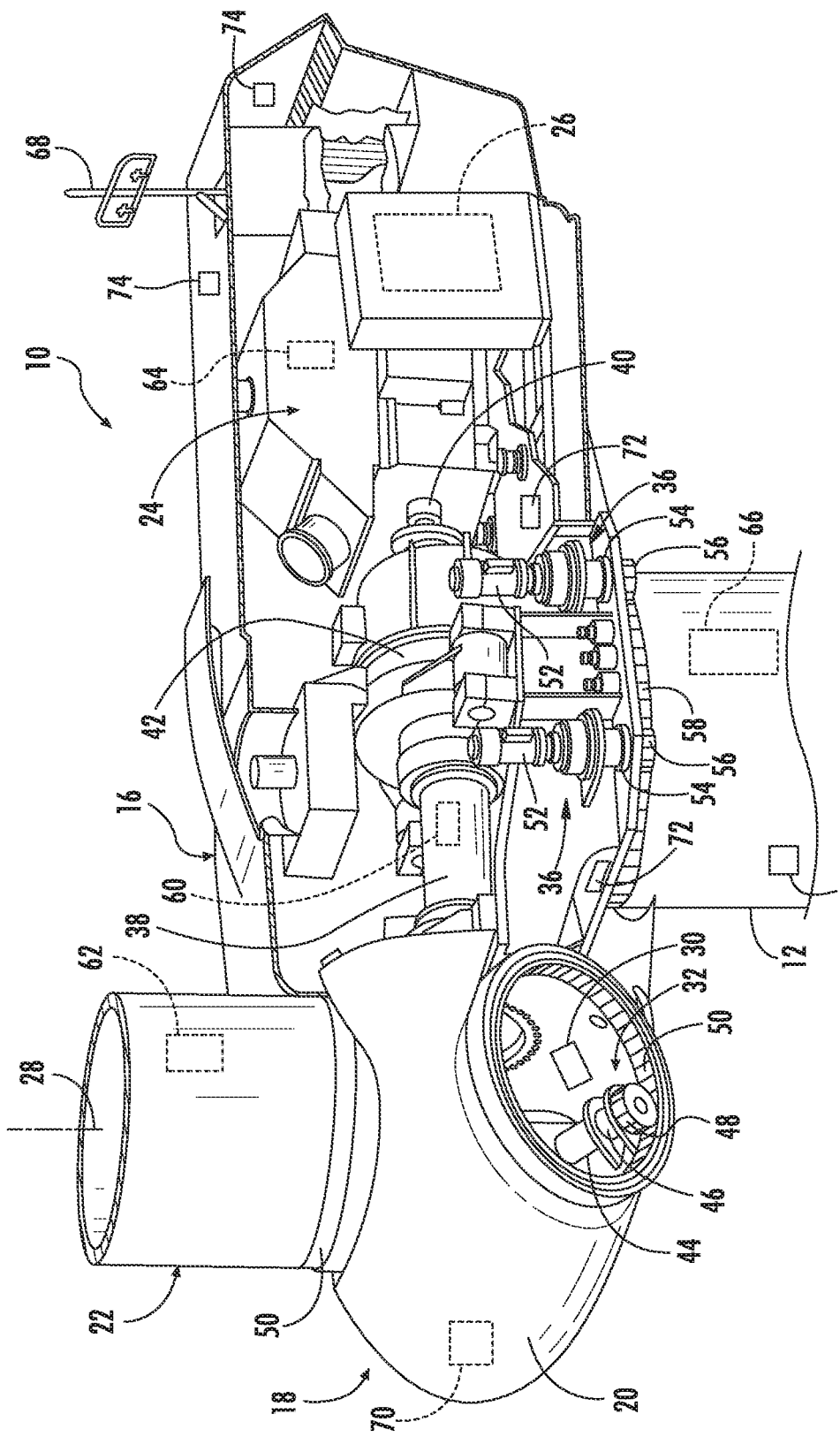
FIG. 2 illustrates a perspective, internal view of one embodiment of a nacelle suitable for use with the wind turbine shown in FIG. 1.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the controller 26 may also be located within the nacelle 16 (e.g., within a control box or panel). However, in other embodiments, the controller 26 may be located within any other component of the wind turbine 10 or at a location outside the wind turbine (e.g., when the controller 26 is configured as a farm controller for controlling a plurality of wind turbines). As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 44 (e.g., any suitable electric motor), a pitch drive gearbox 46, and a pitch drive pinion 48. In such embodiments, the pitch drive motor 44 may be coupled to the pitch drive gearbox 46 so that the pitch drive motor 44 imparts mechanical force to the pitch drive gearbox 46. Similarly, the pitch drive gearbox 46 may be coupled to the pitch drive pinion 48 for rotation therewith. The pitch drive pinion 48 may, in turn, be in rotational engagement with a pitch bearing 50 coupled between the hub 20 and a corresponding rotor blade 22 such that rotation of the pitch drive pinion 48 causes rotation of the pitch bearing 50. Thus, in such embodiments, rotation of the pitch drive motor 44 drives the pitch drive gearbox 46 and the pitch drive pinion 48, thereby rotating the pitch bearing 50 and the rotor blade 22 about the pitch axis 28.

In alternative embodiments, it should be appreciated that each pitch adjustment mechanism 32 may have any other suitable configuration that facilitates rotation of a rotor blade 22 about its pitch axis 28. For instance, pitch adjustment mechanisms 32 are known that include a hydraulic or pneumatic driven device (e.g., a hydraulic or pneumatic cylinder) configured to transmit rotational energy to the pitch bearing 50, thereby causing the rotor blade 22 to rotate about its pitch axis 28. Thus, in several embodiments, instead of the electric pitch drive motor 44 described above, each pitch adjustment mechanism 32 may include a hydraulic or pneumatic driven device that utilizes fluid pressure to apply torque to the pitch bearing 50.

The wind turbine 10 may also include one or more yaw drive mechanisms 36 for adjusting the yaw angle of the nacelle 16. In several embodiments, similar to the pitch adjustment mechanisms 32, each yaw drive mechanism 36 may include a yaw drive motor 52 (e.g., any suitable electric motor), a yaw drive gearbox 54, and a yaw drive pinion 56 coupled together for simultaneous rotation. However, in other embodiments, each yaw drive mechanism 36 may have any other suitable configuration, such as by being hydraulic or pneumatic driven. Regardless, the yaw drive mechanism(s) 36 may be configured to adjust the yaw angle by rotationally engaging the yaw drive pinion 56 with a suitable yaw bearing 58 (also referred to as a slewring or tower ring gear) of the wind turbine 10, thereby allowing the nacelle 16 to be rotated about the yaw axis 34 (FIG. 1) relative to the wind.

It should be appreciated that, by controlling the various components of the wind turbine 10, the controller 26 may be configured to automatically adjust the operation of the wind turbine 10. For example, as indicated above, the controller 26 may be configured to transmit suitable control signals to the pitch adjustment mechanisms 32 (via the pitch controller 30) to automatically adjust the pitch angle of the rotor blades 22. Similarly, the controller 26 may be configured to transmit suitable control signals to the yaw drive mechanism(s) 36 to allow for the yaw angle of the nacelle 16 to be automatically adjusted. In addition, the controller 26 may be communicatively coupled to various other wind turbine components in order to control different aspects of the wind turbine operation. For example, the controller 26 may be communicatively coupled to the generator 24 to allow for the automatic adjustment of the generator torque, generator speed and/or any other suitable operational aspects of the generator 24.

In addition, the wind turbine 10 may also include one or more sensors for monitoring various operating parameters of the wind turbine 10. For example, in several embodiments, the wind turbine 10 may include one or more shaft sensors 60 configured to monitor one or more shaft-related operating parameters of the wind turbine 10, such as the loads acting on the rotor shaft 38 (e.g., thrust, bending and/or torque loads), the deflection of the rotor shaft 38 (e.g., including shaft bending), the rotational speed of the rotor shaft 38 and/or the like. In addition, the wind turbine 10 may include one or more blades sensors 62 (FIGS. 1 and 2) configured to monitor one or more blade-related operating parameters of the wind turbine 10, such as the loads acting on the blades 22 (e.g., bending loads), the deflection of the blades 22 (e.g., including blade bending, twisting and/or the like), the vibration of the blades 22, the noise generated by the blades 22, the pitch angle of the blades 22, the rotational speed of the blades 22 and/or the like. The wind turbine 10 may also include one or more generator sensors 64 configured to monitor one or more generator-related operating parameters of the wind turbine 10, such as the power output of the generator 24, the rotational speed of the generator 24, the generator torque and/or the like.

Moreover, the wind turbine 10 may include one or more turbine wind sensors 68 (e.g., one or more anemometers) for monitoring a local wind speed of the wind turbine 10. As used herein, the term "local wind speed" corresponds to a wind speed associated with a given wind turbine 10 that differs from the free stream wind speed for such wind turbine 10 due to the impact of the turbine's presence at the wind turbine location. Similarly, the free-stream wind speed for a given wind turbine 10 generally corresponds to the wind speed that would be present at the turbine's location if the wind turbine 10 were not otherwise installed at the location. Thus, in several embodiments, the local wind speed may correspond to a wind speed measured at a location on and/or directly adjacent to a component of the wind turbine 10, such as at a location directly downstream of the rotor blades 22. For example, as shown in FIG. 2, a turbine wind sensor(s) 68 is mounted on top of the nacelle 16. As such, the local wind speed measured by the nacelle-mounted turbine wind sensor(s) 68 may differ from the free stream wind speed due to the impact the blades 22, hub 20 and/or nacelle 16 have on the wind as it flows over, across and/or around such components. However, in alternative embodiments, the turbine wind sensor(s) 68 may be configured to be located at any other suitable location on and/or adjacent to the wind turbine 10 that allows for the measurement of a local wind speed associated with the wind turbine 10.

Further, the wind turbine 10 may also include various other sensors for monitoring numerous other turbine operating parameters. For example, as shown in FIG. 2, the wind turbine 10 may include one or more tower sensors 66 for monitoring various tower-related operating parameters, such as the loads acting the tower 12, the deflection of the tower 12 (e.g., tower bending and/or twisting), tower vibrations and/or the like. In addition, the wind turbine 10 may include one or more hub sensors 70 for monitoring various hub-related operating parameters (e.g., the loads transmitted through the hub 20, hub vibrations and/or the like) and/or one or more nacelle sensors 72 (e.g., a load sensor(s), accelerometer(s), etc.) for monitoring one or more nacelle-related operating parameters (e.g., the loads transmitted through the nacelle 16, nacelle vibrations and/or the like).

Similarly, the wind turbine 10 may include one or more temperature sensors 74 for monitoring the one or more temperatures associated with the wind turbine 10 (e.g., the ambient air temperature associated with the wind turbine 10 or an internal temperature of the wind turbine 10) and/or one or more humidity sensors 78 for monitoring the humidity of the ambient environment.

Of course, the wind turbine 10 may further include various other suitable sensors for monitoring any other suitable operating parameters of the wind turbine 10. It should be appreciated that the various sensors described herein may correspond to pre-existing sensors of a wind turbine 10 and/or sensors that have been specifically installed within the wind turbine 10 to allow one or more operating parameters to be monitored. It should also be appreciated that, as used herein, the term "monitor" and variations thereof indicates that the various sensors of the wind turbine 10 may be configured to provide a direct measurement of the operating parameters being monitored or an indirect measurement of such operating parameters. Thus, the sensors may, for example, be used to generate signals relating to the operating parameter being monitored, which can then be utilized by the controller 26 to determine the actual operating parameter.

Figure 3:
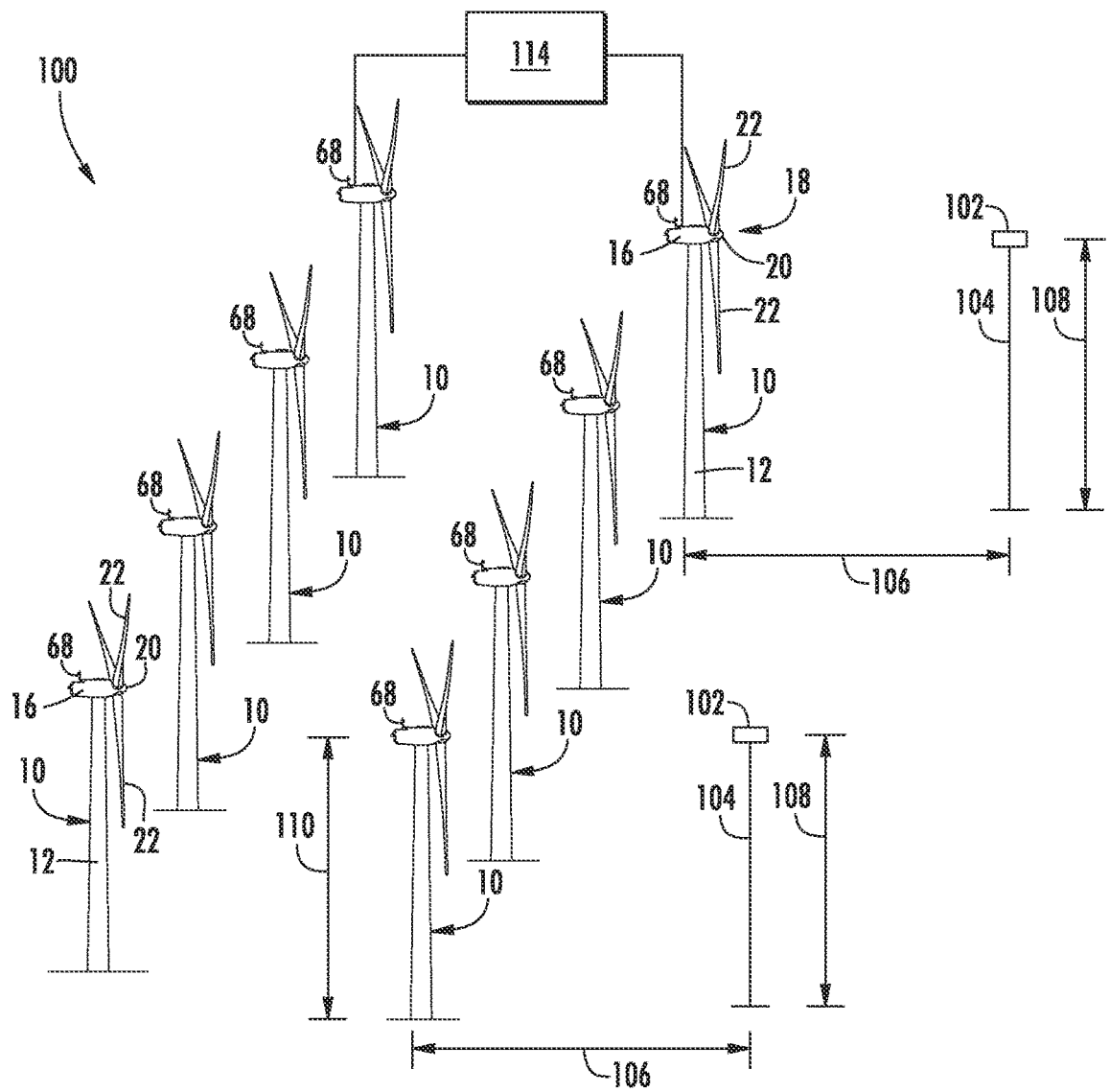
FIG. 3 illustrates a simplified, perspective view of one embodiment of a wind turbine farm in accordance with aspects of the present subject matter.

Referring now to FIG. 3, a perspective view of one embodiment of a wind turbine farm 100 is illustrated in accordance with aspects of the present subject matter. In general, the wind turbine farm 100 may include a plurality of wind turbines 10. For example, as shown in the illustrated embodiment, the wind turbine farm 100 includes eight wind turbines 10. However, in other embodiments, the wind turbine farm 100 may include any other number of wind turbines 10, such as less than eight wind turbines 10 or greater than eight wind turbines 10.

In general, each wind turbine 10 may be configured the same as or similar to the wind turbine 10 described above with reference to FIGS. 1 and 2. For instance, each wind turbine 10 may include a tower 12, a nacelle 16 mounted on top of the tower 12 and a rotor 18 coupled to the nacelle 16, with the rotor 18 including both a rotatable hub 20 and a plurality of rotor blades 22 extending outwardly from the hub 20. In addition, each wind turbine 10 may include any other suitable components known in the art, such as any of the components described above with reference to FIGS. 1 and 2 (e.g., a turbine controller, pitch adjustment mechanisms, various sensors, etc.). For example, as indicated above, each wind turbine 10 may include one or more turbine wind sensors 68 (e.g., nacelle-mounted anemometers) for monitoring a local wind speed of the wind turbine 10. Thus, each wind turbine 10 included within the wind turbine farm 100 may be configured to monitor its own individual local wind speed.

Additionally, as shown in FIG. 3, the wind turbine farm 100 may also include one or more reference wind sensors 102 configured to monitor a reference wind speed for one or more of the wind turbines 10 located within the wind turbine farm 100. In several embodiments, the reference wind speed may correspond to a free-stream wind speed associated with one or more of the wind turbines 10. As indicated above, the free-stream wind speed for a given wind turbine(s) 10 generally corresponds to the wind speed that would occur at the wind turbine location assuming that the wind turbine(s) 10 was not installed at the location. Thus, the free-stream wind speed for one or more of the wind turbines 10 may be approximated, for example, by locating the reference wind sensor(s) 102 at a location upstream of the wind turbine(s) 10 at which the wind speed is unaffected by the presence of such turbine(s). For example, as shown in FIG. 3, in several embodiments, each reference wind sensor 102 may be mounted to a tower 104 (e.g., Meteorological tower (also referred to as a met tower or met mast) positioned upstream of the wind turbine(s) 10 by a given distance 106. In such an embodiment, the towers 104 may be configured such that each reference wind sensor 102 is positioned at a sensor height 108 that is approximately equal to a hub height 110 of the wind turbine(s) 10, thereby allowing the free-stream wind speed to be monitored at a hub-height level.

It should be appreciated that, although the wind turbine farm 100 is shown as simply including two reference wind sensors 102, the farm 100 may generally include any number of reference wind sensors 102, such as a single reference wind sensor 102 or three or more reference wind sensors 102. It should also be appreciated that each reference wind sensor 102 may generally correspond to any suitable sensing device capable of monitoring a reference wind speed for one or more of the wind turbines 10 of the wind turbine farm 100, such as an anemometer, a light detection and ranging (LIDAR) device or any other suitable wind speed measurement device. When using a LIDAR device for each reference wind sensor 102, the reference wind speed measurements may be acquired without mounting the sensor 102 atop a corresponding tower 104.

It should also be appreciated that the wind turbine farm 100 may further include various other suitable farm-level sensors for monitoring any other suitable operating parameters. For example, in one embodiment, the farm 100 may include one or more temperature sensors configured to monitor an average ambient temperature for the farm 100 and/or monitor an ambient temperature(s) at or adjacent to any of the towers 104. Such farm-level temperature sensor(s) may allow for the accuracy of the wind turbine-specific temperature sensor(s) to be assessed, thereby allowing for the identification of defective sensors.

Additionally, wind turbine farm 100 may also include a farm controller 114 communicatively coupled to each wind turbine 10, such as by being communicatively coupled to each turbine's controller 26. It should be appreciated that the farm controller 114 is shown in FIG. 3 as being coupled to only two wind turbines 10 for ease of illustration. One of ordinary skill in the art will recognize that the farm controller 114 may be coupled to each wind turbine 10 (e.g., via a wired or wireless connection).

Similar to each turbine controller 26, the farm controller 114 may generally comprise a computing device and/or any other suitable processing unit. Thus, in several embodiments, the farm controller 114 may include suitable computer-readable instructions that, when implemented, configure the controller 114 perform various different functions, such as issuing and/or transmitting wind turbine control signals to each turbine controller 26. As such, the farm controller 114 may generally be configured to control any or all of the turbine controllers 26 in the wind turbine farm 100 in order to change or alter the operating mode of any number of the wind turbines 10. Specifically, the farm controller 114 may be configured to command a single wind turbine 10, particular groups of wind turbines 10 or all of the wind turbines 10 in the wind turbine farm 100 to enter into a particular operating mode and/or to perform a particular action in order to adapt the wind turbine(s) 10 to changing operating conditions and/or to otherwise control the operation of the turbine(s) 10.

Figure 4:
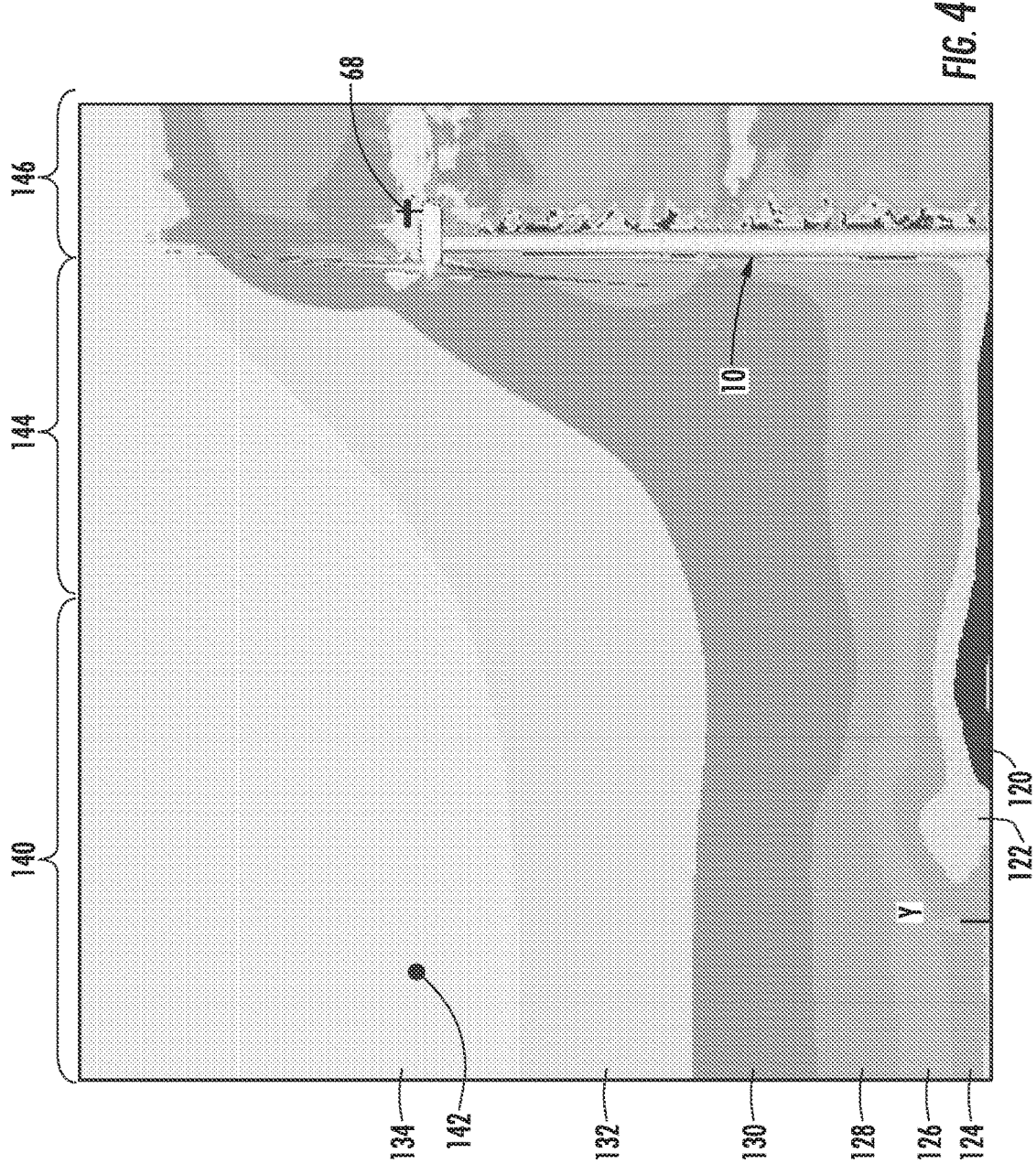
FIG. 4 illustrates an example wind speed profile of wind approaching the location of a wind turbine.

Referring now to FIG. 4, an example wind speed profile for wind approaching the location of a wind turbine 10 is illustrated in accordance with aspects of the present subject matter. As shown in FIG. 4, the wind speed profile includes a plurality of wind speed bands 120, 122, 124, 126, 128, 130, 132, 134 corresponding to specific speed ranges for the wind, with each wind speed band being identified in FIG. 4 with different shading. As shown, the wind speed may exhibit a typical unobstructed speed profile at locations within a first distance range 140 disposed upstream of the wind turbine 10. Specifically, as shown in FIG. 4, the various wind speeds bands may generally be stacked vertically one on top of the other along the first distance range 140, with the wind speed increasing with increasing heights above the ground. Thus, at a given location (indicated by point 142) within the first distance range 140, it may be assumed that the wind speed is unaffected by the wind turbine 10. Accordingly, in several embodiments, the reference wind sensors 102 may be located within such first distance range 104 (e.g., at location 142) to allow for the reference wind speed(s) for the wind turbine(s) to be monitored.

However, as shown in FIG. 4, as the wind flows into a second distance range 144 defined directly upstream of the wind turbine 10, the wind speed profile varies significantly from that within the first distance range 140 as the wind is impacted by the wind turbine 10 located immediately downstream. Additionally, as the wind flows past the wind turbine 10 (e.g., across a third distance range 146), a wake is produced that is characterized by increased wind turbulence and reduced wind speeds. As shown in FIG. 4, in several embodiments, the turbine wind sensor(s) 68 may be configured to measure the local wind speed for each wind turbine 10 within such third distance range 146. Accordingly, it should be appreciated that the local wind speed measured for a wind turbine 10 may differ significantly from the reference wind speed (e.g., a wind speed measured at point 142) for such wind turbine 10.

Figure 5:
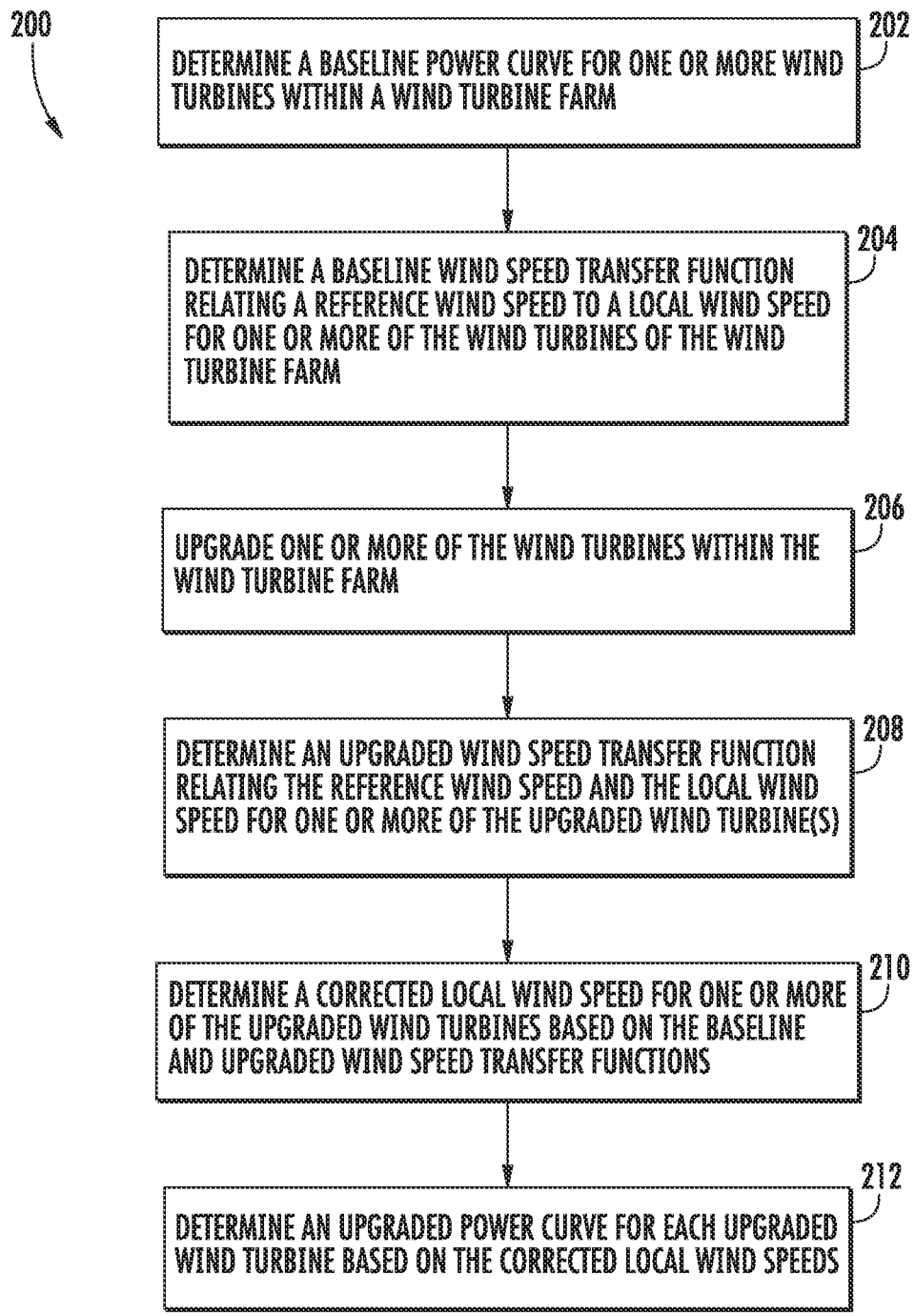
FIG. 5 illustrates a flow diagram of one embodiment of a method for assessing the performance impact of wind turbine upgrades in accordance with aspects of the present subject matter.

Referring now to FIG. 5, a flow diagram of one embodiment of a method 200 for assessing the performance impact of wind turbine upgrades is illustrated in accordance with aspects of the present subject matter. In general, the method 200 will be described herein as being implemented with reference to one or more wind turbines of a wind turbine farm, such as one or more of the wind turbine(s) 10 included within the wind turbine farm 100 described above with reference to FIG. 3. However, it should be appreciated that the disclosed method 200 may also be implemented with reference to a single wind turbine 10. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

In general, the disclosed method 200 may be utilized as a means for quantifying the performance impact provided by installing one or more upgrades on and/or within a wind turbine(s) 10. Specifically, in several embodiments, prior to upgrading any of the wind turbines 10, reference or baseline power curves may be determined for each wind turbine 10 within a wind turbine farm 100 (or for at least each wind turbine 10 being upgraded). In addition, a baseline wind speed transfer function may be established for one or more of the wind turbines 10 being upgraded by collecting data associated with the free-stream wind speed(s) and the local wind speed(s) associated with such wind turbine(s). After determining the baseline power curves and the baseline wind speed transfer function(s), one or more upgrades (e.g., hardware-based and/or control-based upgrades) may be installed on and/or within all or a portion of the wind turbines 10 within the wind farm 100. Thereafter, for the wind turbine(s) 10 for which a baseline wind speed transfer function was established, a second, upgraded wind speed transfer function may be established by collecting data associated with the free-stream wind speed(s) and the local wind speed(s) of such wind turbine(s) 10 post installation of the upgrade(s). The baseline and upgraded wind speed transfer functions may then be utilized to adjust the local wind speed measurements for each upgraded wind turbine 10 to account for the change in performance provided by the upgrade(s). The corrected local wind speed measurements may then be utilized as a reference for plotting upgraded power curves for each of the upgraded wind turbines 10. By comparing the baseline and upgraded power curves for each upgraded wind turbine 10, the performance impact provided by the installed upgrade(s) may be assessed or otherwise quantified. For example, using the power curves, the change in AEP for the upgraded wind turbines 10 may be calculated, thereby providing a direct indicator of the overall impact of the upgrade(s).

As indicated above, it should be appreciated that, once suitable transfer functions are developed for one or more wind turbines at a given wind turbine site, the transfer functions may be utilized to assess wind turbines of the same type or configuration located at the same site (e.g., other wind turbines within the same farm) or at different sites that have received the same or similar upgrades. Thus, measurements of the free-stream wind speed, for example, need only be collected for a limited number of wind turbines (or even a single wind turbine) at a single wind turbine site, thereby reducing the costs associated with data collection. Moreover, the ability to apply the developed transfer functions to wind turbines located at other wind turbine sites may allow for global upgrade assessments to be made on a wind turbine model-by-model basis, thereby allowing for enhanced marketability of service upgrades.

As shown in FIG. 5, at (202), the method 200 includes determining a baseline power curve for one or more wind turbines 10 included within a wind turbine farm 100. Specifically, in several embodiments, a baseline power curve may be determined for each wind turbine 10 within the wind turbine farm 100. Alternatively, baseline power curves may only be determined for the wind turbines 10 located within the wind turbine farm 100 that are actually being upgraded.

Figure 6:
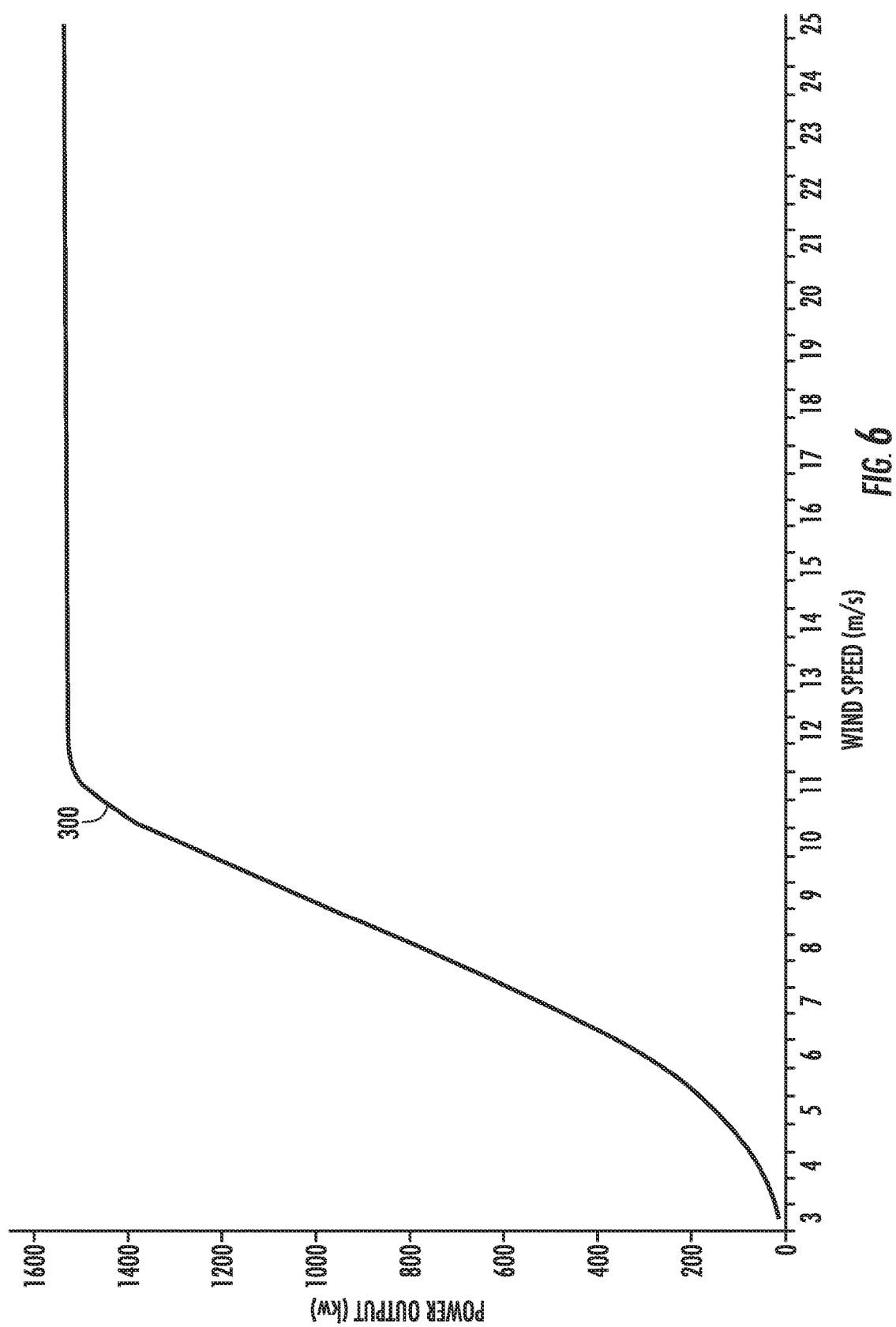
FIG. 6 illustrates an example baseline power curve for a wind turbine in accordance with aspects of the present subject matter.

In accordance with aspects of the present subject matter, the baseline power curve for each wind turbine 10 may be determined by plotting the turbine's power output as a function of its measured local wind speed (as opposed to using a reference wind speed, such as the free-stream wind speed). As indicated above, such wind speed measurements may be provided via suitable turbine wind sensors configured to monitor each turbine's local wind speed (e.g., by using the nacelle-mounted sensors 68 shown in FIGS. 2 and 3). Thus, by individually monitoring the local wind speed for each wind turbine 10 within a wind turbine farm 100, a unique baseline power curve may be established for each wind turbine 10. For instance, FIG. 6 illustrates an example baseline power curve 300 that may be determined by plotting a wind turbine's power output as a function of its local wind speed.

It should be appreciated that the data utilized to determine the baseline power curve for each wind turbine 100 may generally be collected over any suitable time period. For instance, in one embodiment, power output and local wind speed measurements may be collected and stored over a one year period for each wind turbine 10. However, in other embodiments, the measurements may be collected and stored over any other suitable time period, such as less than one year or greater than one year.

Additionally, in several embodiments, multiple baseline power curves may be determined for each wind turbine 10. In such embodiments, the baseline power curves for each wind turbine 10 may be organized or binned as a function of one or more secondary parameters, such as air density, pressure, temperature or any other suitable parameter. As a result, the power curve data may be separated in a manner that allows for the change in wind turbine performance resulting from such secondary parameter(s) to be accommodated, thereby allowing the data to be more accurately analyzed in order to determine the actual performance impact provided by the installed upgrade(s).

For example, in several embodiments, in addition to monitoring the power output and the local wind speed for a particular wind turbine 10, the density of the air surrounding the wind turbine 10 may also be monitored or calculated. Specifically, as indicated above, each wind turbine 10 may include one or more temperature sensors 74 for monitoring the ambient air temperature around a wind turbine 10. In addition, the altitude or elevation of the wind turbine 10 may be a recorded or stored value. Thus, using the stored altitude, the ambient air pressure may be calculated, which then may be used together with the ambient air temperature measurements to calculate the air density. Alternatively, if pressure sensors are available, the ambient air pressure may be monitored directly and subsequently utilized with the temperature measurements to calculate the air density. Each air density calculation may then be stored in a data set together with the corresponding power output and local wind speed measurements taken at the same time.

Figure 7:
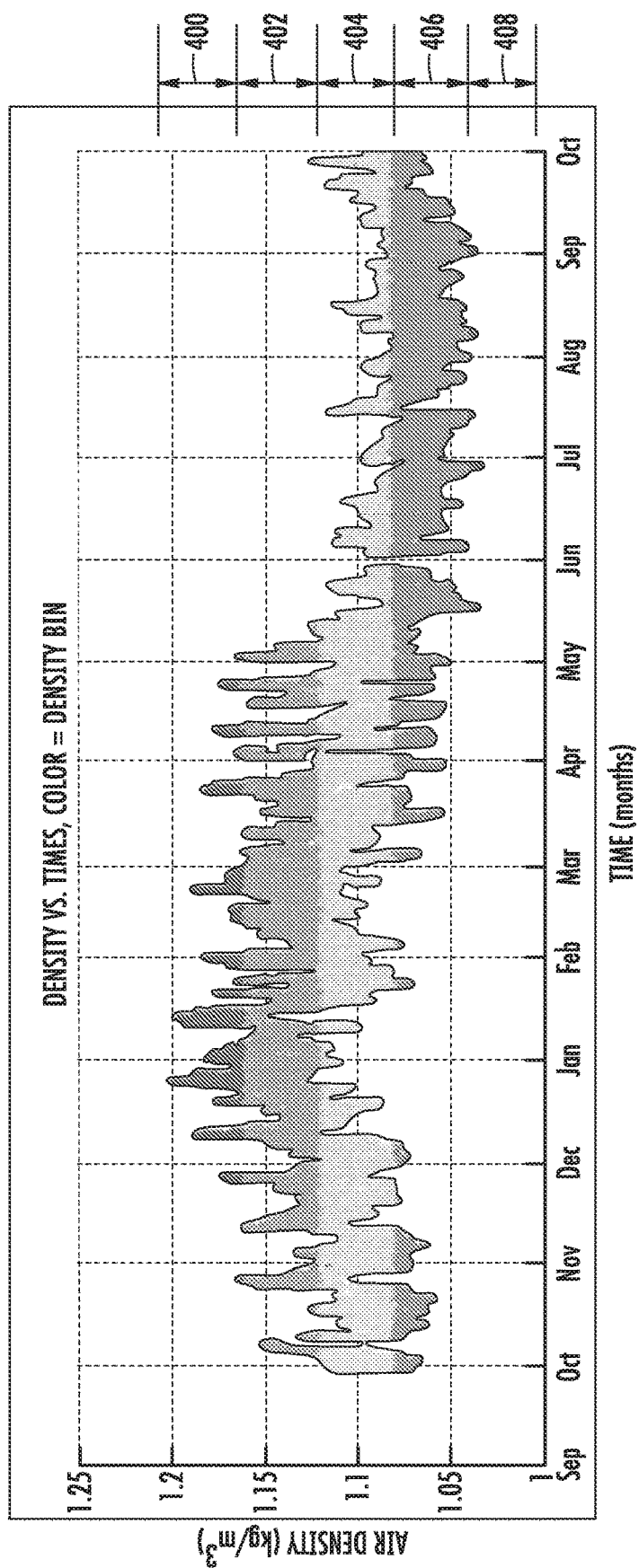
FIG. 7 illustrates a chart providing air density data calculated at a wind turbine farm over a given period of time.

For example, FIG. 7 illustrates an example chart providing air density calculations performed at a wind turbine farm 100 over a specific period of time (e.g., one year). By collecting a significant amount of air density data over an extended period of time, the data may be grouped or binned and subsequently utilized as a means for defining separate baseline power curves for a given wind turbine 10 as function of each density bin. Specifically, in several embodiments, a mean density value may be calculated for the air density data and then separate density bins may be defined around the mean density value using a given density increment or range. For instance, as shown in FIG. 7, the air density data has been divided into a plurality of bins (e.g., a first density bin 400, a second density bin 402, a third density bin 404, a fourth density bin 406 and a fifth density bin 408), with each density bin having a density range of about 0.04 kg/m^3. The data points included within each density bin 400, 402, 404, 406, 408 are identified in FIG. 7 with different shading. In other embodiments, it should be appreciated that any other suitable density range may be utilized to divide the air density data into a given number of density bins. However, it has been found that, in general, a density range of from about 0.02 kg/m^3 to about 0.06 kg/m^3 provides for desirable granularity and data binning of the air density data.

Figure 8:
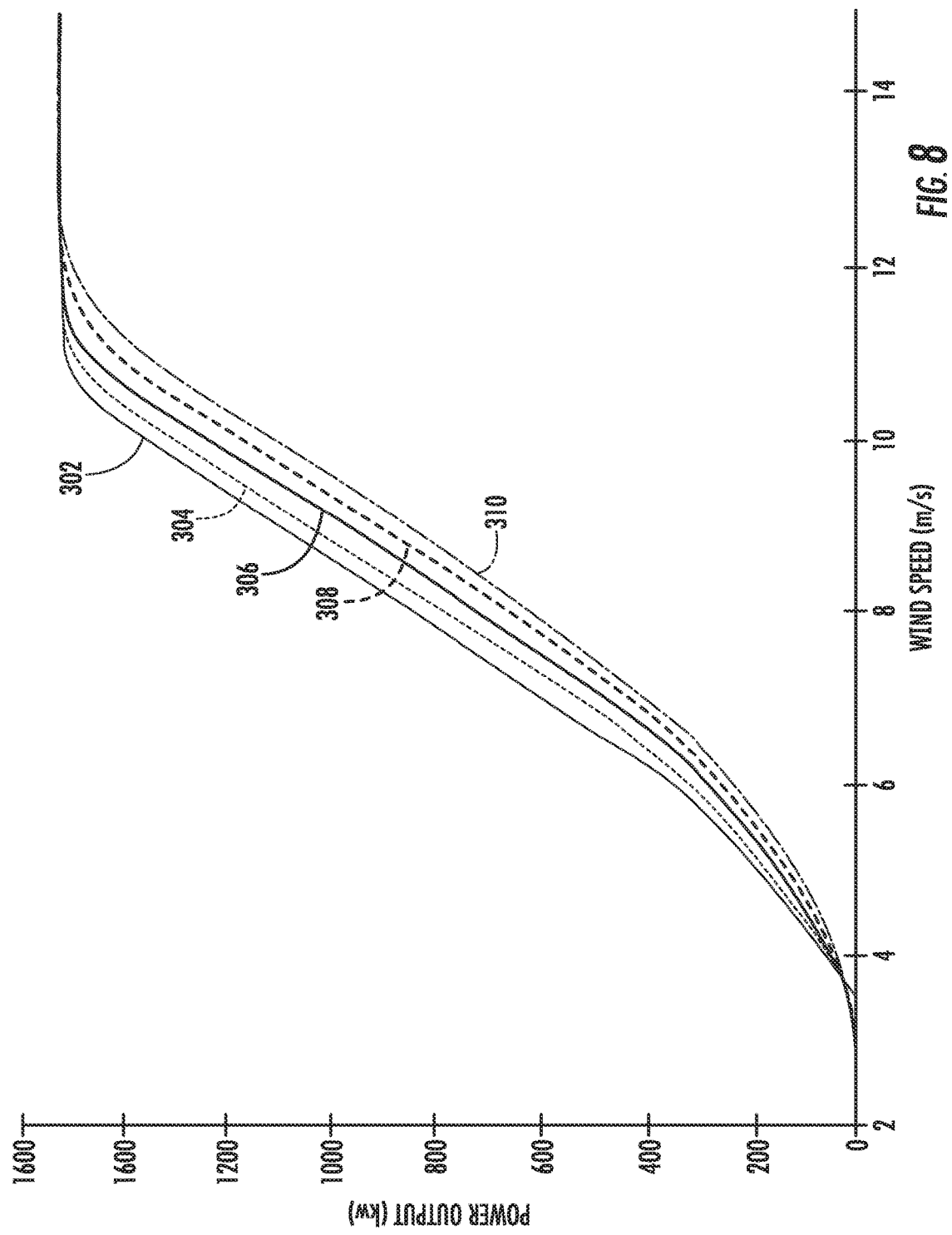
FIG. 8 illustrates a plurality of baseline power curves plotted as a function of a corresponding number of air density bins.

By binning the air density data, the power output and local wind speed measurements associated with the specific data points included within each density bin may be plotted to define baseline power curves at each density bin. For instance, FIG. 8 illustrates example baseline power curves for a wind turbine 10 plotted using the example air density data shown in FIG. 7. As shown in FIG. 8, a first baseline power curve 302 is defined that provides a correlation between power output and local wind speed for the wind turbine 10 at air densities included within the first density bin 400. Similarly, second, third, fourth and fifth baseline power curves 304, 306, 308, 310 are also defined that provide correlations between power output and local wind speed for the wind turbine 10 at the air densities included within the second, third, fourth and fifth density bins 402, 404, 406, 408, respectively. As shown in FIG. 8, as the air density increases, the power curve for the wind turbine 10 is shifted to the left. Accordingly, by plotting separate power curves as a function of the air density, the variation in wind turbine performance associated with changes in the air density may be identified and accounted for so that similar density-related, post-upgrade power curves may be compared to the power curves shown in FIG. 8 to allow for the performance impact resulting from installed upgrade(s) to be more accurately identified.

It should be appreciated that, in addition to providing a means for organizing or binning the power curve data, the air density data may also be utilized to improve the accuracy of the local wind speed measurements provided by the turbine wind sensors 68. For example, as is generally understood by those of ordinary skill in the art, international standards (e.g., IEC 61400-12-1, 2005) provide for wind speed measurements to be corrected or normalized based on air density. Thus, in several embodiments, the local wind speed measurements utilized to determine the baseline power curve(s) (and also the upgraded power curve(s)) for each wind turbine 10 may correspond to normalized wind speed measurements that have been corrected as a function of the air density.

It should also be appreciated that, in alternative embodiments, any other suitable secondary parameter may be utilized as a means for organizing or binning the power curve data. For example, in one embodiment, the power curve data may be organized or binned based on the ambient air temperature associated with a wind turbine 10 and/or the barometric air pressure associated with a wind turbine. In another embodiment, the power curve data may be organized or binned based on the time of year at which the data was collected. For instance, the power curve data may be binned weekly, monthly or according to seasons.

Referring back to FIG. 5, at (204), the method 200 includes determining a baseline wind speed transfer function relating a reference wind speed to a local wind speed for one or more of the wind turbines 10 of the wind turbine farm 100. Specifically, in several embodiments, the baseline wind speed transfer function may be determined for one or more of the wind turbines 10 being upgraded. As indicated above, the reference wind speed associated with a given wind turbine 10 (e.g., the free-stream wind speed associated with the wind turbine 10) may be monitored using one or more reference wind sensor(s) 102 located within the wind farm 100 (e.g., a suitable wind sensor 102 mounted on a tower 104 located upstream of one or more of the wind turbines 10). Additionally, as indicated above, the local wind speed for a given wind turbine 10 may be monitored using the turbine wind sensor(s) 68 associated with such wind turbine 10 (e.g., the nacelle-mounted anemometers). Thus, by simultaneously monitoring the reference wind speed and the local wind speed for one or more of the wind turbines 10 within the wind farm 100, a given relationship may be established between the reference and local wind speeds for such wind turbine(s) 10.

Specifically, in several embodiments, the wind speed measurements provided by the turbine and reference wind sensors 68, 102 may be initially time synchronized. Thereafter, average wind speed measurements (e.g., a ten-minute average wind speed measurement) may be collected and stored for both the reference wind speed and local wind speed associated with each wind turbine 10 for which a baseline wind speed transfer function is being established. It should be appreciated that, the specific time period over which the wind speed measurements are collected may generally vary depending on the number of wind speed bins defined for the collection period. For example, using wind speed bins defined by a speed range of +/−0.25 m/s (e.g., wind speed bins with median wind speeds of 3.0 m/s, 3.5 m/s, 4.0 m/s 4.5 m/s, 5.0 m/s . . . 23.0 m/s, 23.5 m/s, 24.0 m/s 24.5 m/s 25.0 m/s), the data collection period may generally range from about three to six months to allow each bin to include a minimum of 30 minutes of sampled data and for the database, as a whole, to include a minimum of 180 hours of sampled data.

In general, it should be appreciated that any suitable mathematical relationship may be utilized to establish the baseline wind speed transfer function for each wind turbine 10. However, in several embodiments, the baseline wind speed transfer function may correspond to a ratio of the reference wind speed to the local wind speed for a given wind turbine 10 at each defined wind speed bin. For example, in one embodiment, the baseline wind speed transfer function may be expressed according to the following equation (Equation (1)):

$$TF_{base,i} = \frac{1}{N_i} \sum_{j=1}^{N_i} \frac{WS_{ro_{i,j}}}{WS_{lo_{i,j}}} \qquad (1)$$

Wherein, $TF_{base,i}$ corresponds to the baseline wind speed transfer function for a wind turbine 10 at a given wind speed bin (i), $N_i$ corresponds to the number of measurements collected within the wind speed bin (i) (e.g., the number of ten-minute averaged wind speed measurements), $WS_{ro_{i,j}}$ corresponds to the normalized reference wind speed of measurement (j) in wind speed bin (i) prior to any upgrades being installed and $WS_{lo_{i,j}}$ corresponds to the normalized local wind speed of measurement (j) in wind speed bin (i) prior to any upgrades being installed.

Alternatively, the baseline wind speed transfer function may be developed using a regression analysis. Specifically, in several embodiments, the baseline transfer function may be developed using a polynomial regression in which the relationship between the local wind speed and the reference wind speed is modeled as a first order, second order, third order or higher polynomial. For example, the time synchronized local and reference wind speed measurements may be plotted (e.g., by plotting the local wind speed along the x-axis and reference wind speed along the y-axis) and then a suitable polynomial regression model may be fit to the plotted data using any suitable means (e.g., using a least squares methodology). The resulting model may then be utilized as the baseline wind speed transfer function.

It should be appreciated that, in other embodiments, the baseline transfer function may be defined using any other suitable formula or model that provides for a relationship between the reference wind speed and the local wind speed for a given wind turbine 10.

Additionally, at (206), the method 200 includes upgrading one or more of the wind turbines 10 within the wind turbine farm 100. In general, the specific upgrade(s) installed on and/or within the wind turbine(s) 10 may correspond to any suitable improvement and/or changes associated with the wind turbine's configuration and/or manner of operation. Thus, in several embodiments, the upgrade(s) may be hardware-related, control-related and/or a combination of both. For instance, hardware-related upgrades may correspond to the replacement of and/or changes in the configuration of one or more of the existing components of the wind turbine 10 (e.g., by replacing the rotor blades 22 with new rotor blades having improved aerodynamics) and/or to the installation of one or more new components on and/or within any existing components of the wind turbine 10 (e.g., by installing surface modifiers, such as vortex generators, on the exterior of one or more of the rotor blades 22 to adjust the aerodynamic properties of the blades 22). Similarly, control-related upgrades may correspond to changes on the control strategy for controlling the operation of the wind turbine 10 (e.g., by uploading new or additional software within the turbine's controller 26 or by simply modifying existing software installed within the controller 26).

Referring still to FIG. 5, at (208), the method 200 includes determining an upgraded wind speed transfer function for one or more of the upgraded wind turbines 10. Specifically, in several embodiments, the upgraded wind speed transfer function may be determined for one or more of the wind turbines 10 for which a baseline wind speed transfer function was established.

In general, the upgraded wind speed transfer function may be determined in the same manner as the baseline wind speed transfer function. Specifically, the reference wind speed (e.g., the free-stream wind speed) and the local wind speed for each upgraded wind turbine 10 may be simultaneously monitored (e.g., via the reference wind sensors 102 and the turbine wind sensors 68, respectively) over a given data collection period. A suitable relationship may then be established between the reference and local wind speeds in order to define the upgraded wind speed transfer function for each wind turbine 10. For instance, using the example equation (Equation (1)) provided above for the baseline wind speed transfer function, the upgraded wind speed transfer function may be expressed according to the following equation (Equation (2)):

$$TF_{upgrade,i} = \frac{1}{N_i} \sum_{j=1}^{N_i} \frac{WS_{r1_{i,j}}}{WS_{l1_{i,j}}} \quad (2)$$

Wherein, $TF_{upgrade,i}$ corresponds to the upgraded wind speed transfer function for a wind turbine at a given wind speed bin (i), $N_i$ corresponds to the number of measurements collected within the wind speed bin (i) (e.g., the number of ten-minute averaged wind speed measurements), $WS_{r1_{i,j}}$ corresponds to the normalized reference wind speed of measurement (j) in wind speed bin (i) after the upgrade(s) were installed and $WS_{l1_{i,j}}$ corresponds to the normalized local wind speed of measurement (j) in wind speed bin (i) after the upgrade(s) were installed.

Alternatively, the upgraded wind speed transfer function may be developed using a polynomial regression in which the relationship between the local and reference wind speeds is modeled as a second order, third order or higher polynomial. For example, the time synchronized, post-upgrade local and reference wind speed measurements may be plotted (e.g., by plotting the local wind speed along the x-axis and reference wind speed along the y-axis) and then a suitable polynomial regression model may be fit to the plotted data using any suitable means (e.g., using a least squares methodology). The resulting model may then be utilized as the reference wind speed transfer function. It should be appreciated that, when the baseline and upgraded wind speed transfer functions are developed using a regression analysis, it may be desirable to fit the pre-upgrade and post-upgrade wind data with a polynomial regression model of the same order, such as by defining both the baseline wind speed transfer function and the upgraded wind speed transfer function as a second order polynomial.

Additionally, it should be appreciated that, in other embodiments, the upgraded transfer function may be defined using any other suitable formula that provides a relationship between the reference wind speed and the local wind speed for a given wind turbine 10.

Additionally, as shown in FIG. 5, at (210), the method 200 includes determining a corrected local wind speed for one or more of the upgraded wind turbines 10 based on the baseline and upgraded wind speed transfer functions. In general, the corrected local wind speed may correspond to an adjusted local wind speed value calculated as a function of the baseline and upgraded wind speed transfer functions so as to take into account the upgrades made to the wind turbine(s). As will be described below, the corrected local wind speed may, in turn, be utilized to determine an upgraded power curve for each upgraded wind turbine.

In several embodiments, the corrected local wind speed may be determined based on a wind speed correction factor calculated as a function of the baseline and upgraded wind speed transfer functions. Specifically, in embodiments in which the transfer functions are calculated as a ratio of the reference wind speed to the local wind speed (e.g., using Equations (1) and (2)), the wind speed correction factor may correspond to a ratio of the baseline wind speed transfer function to the upgraded wind speed transfer function for each wind speed bin across which data was collected. For example, the wind speed correction factor may be calculated according to the following equation (Equation (3)):

$$CF_i = \frac{TF_{base,i}}{TF_{upgrade,i}} \quad (3)$$

wherein, $CF_i$ corresponds to the wind speed correction factor for a given wind speed bin (i), $TF_{base,i}$ corresponds to the baseline wind speed transfer function for the wind speed bin (i) and $TF_{upgrade,i}$ corresponds to the upgraded wind speed transfer function for the wind speed bin (i).

Of course, it should be appreciated that, in alternative embodiments, the wind speed correction factor may be defined using any other suitable formula that provides for a relationship between the baseline and upgraded wind speed transfer functions.

Additionally, it should be appreciated that the local wind speed measurements for each upgraded wind turbine 10 may be adjusted based on the specific correction factor determined for such wind turbine 10 based on its baseline and upgraded wind speed transfer functions. Alternatively, if correction factors are only available for a portion of the upgraded turbines 10, the calculated correction factors may be averaged to define an averaged correction factor for each wind speed bin. Such averaged correction factors may then be utilized to adjust the local wind speed measurements for each upgraded wind turbine 10.

In several embodiments, the wind speed correction factor(s) may be utilized as a multiplier for adjusting the local wind speed measurements for each wind turbine 10.

For instance, in one embodiment, the local wind speed measurements for a given wind turbine 10 may be adjusted based on the wind speed correction factors(s) using the following equation (Equation (4)).

$$WS_{corrected} = WS_i * CF_i \quad (4)$$

wherein, $WS_{corrected}$ corresponds to the adjusted or corrected local wind speed, $WS_i$ corresponds to the local wind speed measurement for the upgraded wind turbine 10 and $CF_i$ corresponds to the correction factor associated with the wind speed bin (i) within which the local wind speed measurement ($WS_i$) falls. As indicated above, the local wind speed measurement ($WS_l$) may correspond to direct wind speed measurements provided by the turbine wind sensors 68 or normalized local wind speed measurements that have been corrected based on air density.

Alternatively, in embodiments in which the baseline and updated wind speed transfer functions are calculated using a regression analysis, the resulting polynomial models may be utilized to calculate the corrected local wind speed. For example, in one embodiment, the difference between the polynomial model corresponding to the baseline wind speed transfer function and the polynomial model corresponding to the upgraded wind speed transfer function may be determined so as to define a delta wind speed transfer function for each upgraded wind turbine. For instance, the delta wind speed transfer function may be calculated according to the following equation (Equation 5):

$$\Delta TF = TF_{upgrade} - TF_{base} \quad (5)$$

wherein, $\Delta TF$ corresponds to the delta wind speed transfer function, $TF_{upgrade}$ corresponds to the polynomial regression model developed based on the post-upgrade wind speed data and $TF_{base}$ corresponds to the polynomial regression model developed based on the pre-upgrade wind speed data.

Using the delta wind speed transfer function, a correction value may be determined for each wind speed that allows for the corrected local wind speed to be calculated for each upgraded wind turbine. For example, the delta wind speed transfer function may be utilized to determine a value that can be added or subtracted to the local wind speed to determine the corrected local wind speed. Alternatively, the delta wind speed transfer function may, itself, correspond to a polynomial function rather than just an offset.

In other embodiments, the polynomial equations determined for the baseline and upgraded wind speed transfer functions may be utilized to back-calculate a corrected local wind speed. For example, by inserting the local wind speed measurements for an upgraded wind turbine into the upgraded transfer function, a corresponding reference wind speed may be calculated for each local wind speed. Thereafter, the corrected location wind sped may be calculated by solving the local wind speed necessary to achieve the calculated reference wind speed using the baseline wind speed transfer function.

In further embodiments, the polynomial equations determined for the baseline and upgraded wind speed transfer functions may be utilized in any other manner that allows for corrected local wind speeds to be determined.

Figure 9:
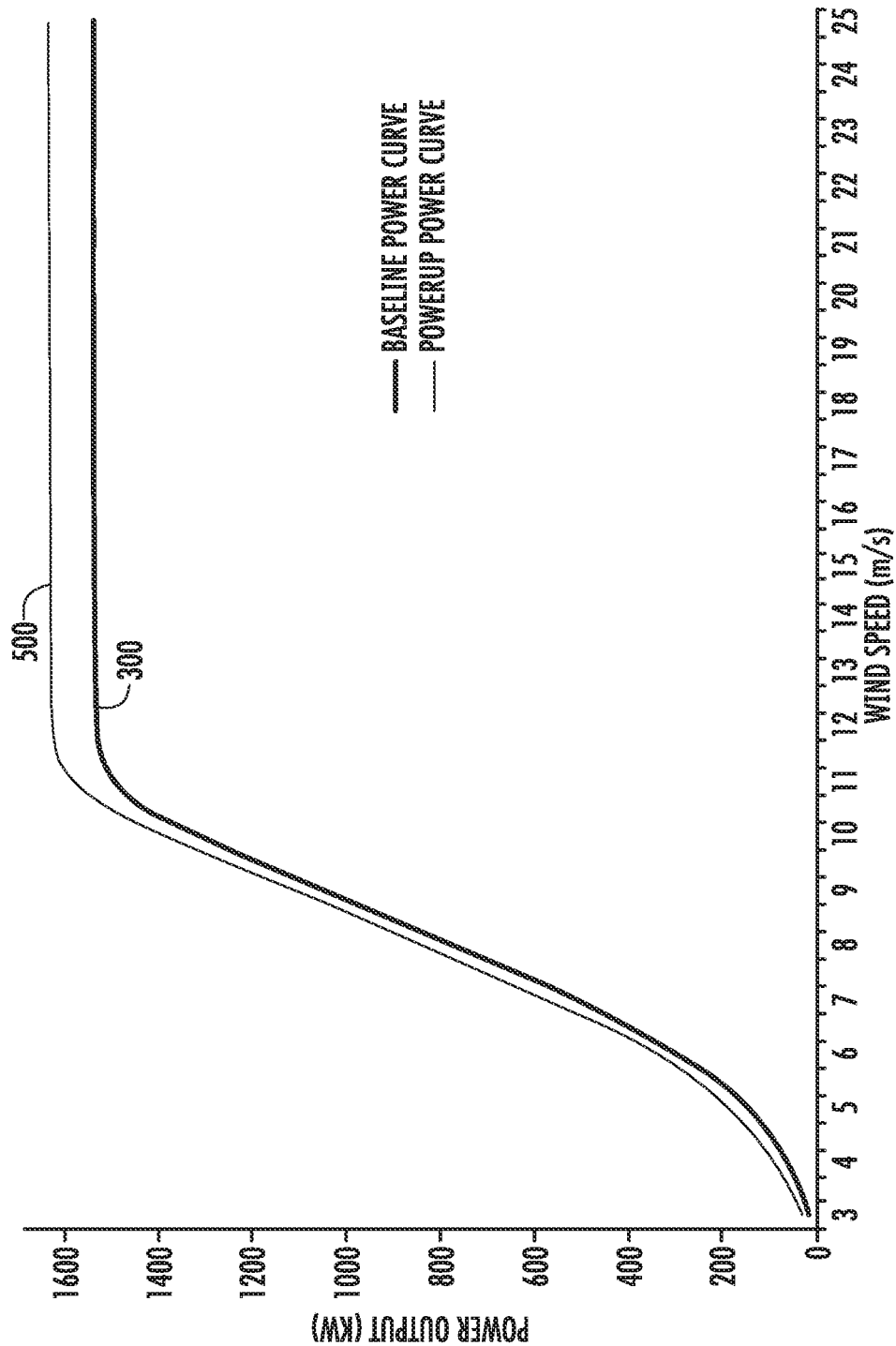
FIG. 9 illustrates the example baseline power curve shown in FIG. 6 and an example upgraded power curve for the wind turbine in accordance with aspects of the present subject matter.

Referring still to FIG. 5, at (212), the method 200 includes determining an upgraded power curve for each upgraded wind turbine 10 based on the corrected local wind speeds calculated for each wind turbine 10. Specifically, in several embodiments, the upgraded power curve for each wind turbine 10 may be determined by plotting the turbine's power output as a function of its corrected local wind speed (e.g., as determined at (212). The upgraded power curve for each upgraded wind turbine 10 may then be compared to the corresponding baseline power curve for such wind turbine 10 in order to assess the performance impact provided by the installed upgrade(s). For instance, FIG. 9 illustrates the example baseline power curve 300 shown in FIG. 6 for a given wind turbine 10 as well as an example upgraded power curve 500 after the wind turbine 10 has been upgraded. As shown, the upgraded power curve 500 is shifted upwards relative to the baseline power curve 300, thereby indicating that the turbine upgrade(s) has provided for improved performance of the wind turbine 10.

Additionally, it should be appreciated that, in several embodiments, multiple upgraded power curves may be determined for each upgraded wind turbine 10, with each upgraded power curve being organized or binned as a function of one or more secondary parameters, such as air density or temperature. For instance, similar to that described above with reference to the baseline power curves, in addition to monitoring the power output and the local wind speed for a particular upgraded wind turbine 10, the air density of the air surrounding the wind turbine 10 may also be monitored or calculated (e.g., by calculating the air density using the temperature measurements provided by the temperature sensors 74 and stored altitude value). By collecting a significant amount of air density data over an extended period of time, the data may be grouped or binned and subsequently utilized as a means for defining separate upgraded power curves for a given upgraded wind turbine 10 as function of each density bin. In such an embodiment, the baseline power curve associated with a given density bin may be compared to the corresponding updated power curve for such density bin in order to assess the performance impact of the installed upgrade(s).

It should be appreciated that any suitable methodology or analysis may be utilized to compare or otherwise quantify the difference between the power curve data associated with baseline and upgraded power curves. For instance, in several embodiments, a baseline AEP may be calculated for a specific wind turbine 10 based on its baseline power curve data and an upgraded AEP may be calculated for such wind turbine 10 based on its upgraded power curve data. Such AEP values may calculated, for example, using the following equations (Equations (6) and (7)):

$$AEP_{base} = \sum_{i=1}^{N} \frac{Power_{base,i}}{1000} * Hours_i * PLF \quad (6)$$

$$AEP_{upgrade} = \sum_{i=1}^{N} \frac{Power_{upgrade,i}}{1000} * Hours_i * PLF \quad (7)$$

wherein, $AEP_{base}$ corresponds to the baseline AEP associated with the wind turbine 10 prior to the turbine being upgraded, $Power_{base,i}$ corresponds to the baseline power output at a given wind speed bin (i) for the wind turbine 10 prior to being upgraded, $AEP_{upgrade}$ corresponds to the upgraded AEP associated with the upgraded wind turbine, $Power_{upgrade,i}$ corresponds to the upgraded power output at the wind speed bin (i) for the upgraded wind turbine 10, $Hours_i$ corresponds to the number of hours spent per year in the wind speed bin (i), N corresponds to the number of wind speed bins and PLF represents a power loss factor corresponding to the transmission losses associated with the wind turbine 10 or the wind turbine farm 100 within which the wind turbine 10 is installed. It should be appreciated that the inclusion of the power loss factor (PLF) is optional.

By calculating the baseline and upgraded AEP values, such AEP values may then be compared directly to determine the exact performance impact provided to a wind turbine 10 via the installed upgrade(s). This performance impact may be expressed, for example, simply as the difference between the baseline and upgraded AEP values (e.g., in terms of an overall increase in megawatt hours (MWh) for a given wind turbine 10). Alternatively, the performance impact may be expressed as a percentage increase in the overall AEP for the wind turbine 10 using the following equation (Equation 8):

$$PI = \frac{AEP_{upgrade} - AEP_{base}}{AEP_{base}} * 100\% \quad (8)$$

wherein, PI corresponds to the percentage increase in AEP achieved due to the wind turbine upgrade(s), $AEP_{base}$ corresponds to the baseline AEP associated with the wind turbine 10 prior to the turbine being upgraded and $AEP_{upgrade}$ corresponds to the upgraded AEP associated with the upgraded wind turbine 10.

It should be appreciated that, as indicated above, embodiments of the disclosed methodology may be utilized to assess the performance impact for any suitable wind turbines receiving the same or similar upgrades to the wind turbine(s) for which the wind speed transfer functions were developed. For instance, baseline and upgraded wind speed transfer functions may be developed for a first wind turbine. Thereafter, such transfer functions may then be utilized in combination with measured local wind speeds of a second upgraded wind turbine (e.g., a wind turbine located at the same wind turbine site as the first wind turbine or at a completely different wind turbine site) to determine corrected local wind speeds for the second wind turbine. Similar to the methodology described above, the corrected local wind speeds may then be utilized to determine an upgraded power curve for the second wind turbine, which may then be compared to the baseline power data for the second wind turbine in order to quantify the performance impact of the upgrade on the second wind turbine.

It should also be appreciated that, in several embodiments, one or more of the various method elements 202-214 may be configured to be performed automatically by the turbine controller 26 of one or more of the individual wind turbines 10, by the farm controller 114 configured to control one or more of the wind turbines 10 of a wind turbine farm 100 or by a combination of both the turbine controller(s) 26 and the farm controller 114. For instance, in a particular embodiment, method elements 202, 204, 208, 210, 212 and 214 may be configured to be implemented automatically via one or both of the controllers 26, 114.

Figure 10:
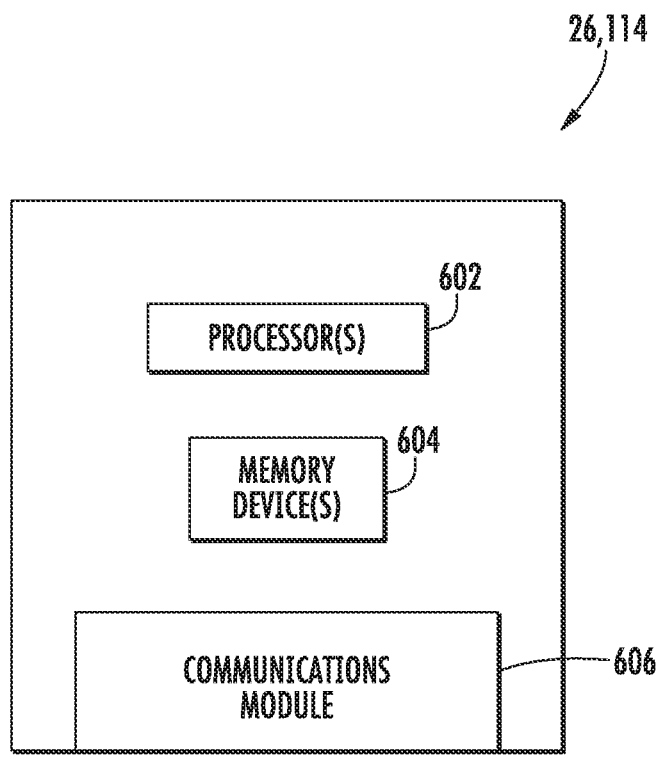
FIG. 10 illustrates a schematic view of one embodiment of suitable components that may be included within a turbine controller of each wind turbine and/or a farm controller of the wind farm in accordance with aspects of the present subject matter.

Referring now to FIG. 10, a block diagram of one embodiment of suitable components that may be included within each turbine controller 26 and/or the farm controller 114 is illustrated in accordance with aspects of the present subject matter. As shown, the turbine controller 26 and/or the farm controller 114 may include one or more processor(s) 602 and associated memory device(s) 604 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 604 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 604 may generally be configured to store suitable computer-readable instructions that, when implemented by the processor(s) 602, configure each turbine controller 26 and/or the farm controller 114 to perform various functions including, but not limited to, one or more of the method elements shown in FIG. 5.

Additionally, each turbine controller 26 and/or farm controller 114 may also include a communications module 606 to facilitate communications between the controller(s) 26, 114 and the various components of each wind turbine 10 and/or to facilitate communications between each controller 26, 114. For instance, the communications module 606 may include a sensor interface (e.g., one or more analog-to-digital converters) to permit the signals transmitted by the wind turbine sensor(s) to be converted into signals that can be understood and processed by the processors 602.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assessing the performance impact of wind turbine upgrades, the method comprising:

determining, with a computing device, a baseline power curve for a wind turbine prior to the wind turbine being upgraded;

determining a baseline wind speed transfer function for the wind turbine prior to the wind turbine being upgraded, the baseline wind speed transfer function relating a reference wind speed to a local wind speed for the wind turbine;

controlling an operation of the wind turbine after the wind turbine is upgraded while collecting data associated with the reference wind speed for the wind turbine from one or more reference wind sensors and the local wind speed for the wind turbine from one or more local wind speed sensors;

determining an upgraded wind speed transfer function for the wind turbine after the wind turbine is upgraded, the upgraded wind speed transfer function relating the reference wind speed to the local wind speed for the wind turbine measured after the wind turbine is upgraded;

determining a corrected local wind speed for the wind turbine based on the baseline and upgraded wind speed transfer functions;

determining an upgraded power curve for the wind turbine based on the corrected local wind speed; and comparing the baseline power curve directly to the upgraded power curve in order to assess a performance impact provided to the upgraded wind turbine.

2. The method of claim 1, wherein determining the baseline wind speed transfer function comprises analyzing the reference wind speed and the local wind speed using a polynomial regression analysis so as to define the baseline wind speed transfer function as a baseline polynomial function.

3. The method of claim 2, wherein determining the upgraded wind speed transfer function comprises analyzing the reference wind speed and the local wind speed measured after the wind turbine is upgraded using a polynomial regression analysis so as to define the upgraded wind speed transfer function as an upgraded polynomial function.

4. The method of claim 3, wherein the corrected local wind speed is determined based on the baseline and upgraded polynomial functions.

5. The method of claim 3, further comprising determining a delta wind speed transfer function based on the baseline and upgraded polynomial functions.

6. The method of claim 5, wherein the corrected local wind speed is determined based on the delta wind speed transfer function.

7. The method of claim 1, wherein the baseline wind speed transfer function corresponds to a ratio of the reference wind speed to the local wind speed for the wind turbine, the reference wind speed corresponding to a free stream wind speed associated with the wind turbine.

8. The method of claim 1, further comprising determining a wind speed correction factor based on the baseline and upgraded wind speed transfer functions.

9. The method of claim 8, wherein the corrected local wind speed is determined based on the wind speed correction factor.

10. The method of claim 8, wherein the wind speed correction factor corresponds to a ratio of the baseline wind speed transfer function and the upgraded wind speed transfer function.

11. The method of claim 1, further comprising upgrading the wind turbine by replacing an existing component of the wind turbine or by installing a new component on or within a component of the wind turbine.

12. A method for assessing the performance impact of wind turbine upgrades, the method comprising:
determining, with a computing device, a baseline wind speed transfer function for a first wind turbine prior to the first wind turbine being upgraded, the baseline wind speed transfer function relating a reference wind speed to a local wind speed for the first wind turbine;
control ling an operation of the first wind turbine after the first wind turbine is upgraded while collecting data associated with the reference wind speed for the first wind turbine from one or more reference wind sensors and the local wind speed for the first wind turbine from one or more local wind speed sensors;
determining an upgraded wind speed transfer function for the first wind turbine after the first wind turbine is upgraded; the upgraded wind speed transfer function relating the reference wind speed to the local wind speed for the first wind turbine measured after the first wind turbine is upgraded;
determining a baseline power curve for a second wind turbine prior to the second wind turbine being upgraded;
determining a corrected local wind speed for the second wind turbine after the second wind turbine is upgraded based on the baseline and upgraded wind speed transfer functions determined for the first wind turbine;
determining an upgraded power curve for the second wind turbine based on the corrected local wind speed; and
comparing the baseline power curve directly to the upgraded power curve in order to assess a performance impact provided to the upgraded second wind turbine.

13. The method of claim 12, wherein the first and second wind turbines are located at the same wind turbine site or at different wind turbine sites.

14. The method of claim 12, wherein determining the baseline wind speed transfer function comprises analyzing the reference wind speed and the local wind speed using a polynomial regression analysis so as to define the baseline wind speed transfer function as a baseline polynomial function and wherein determining the upgraded wind speed transfer function comprises analyzing the reference wind speed and the local wind speed measured after the first wind turbine is upgraded using a polynomial regression analysis so as to define the upgraded wind speed transfer function as an upgraded polynomial function.

15. The method of claim 14, wherein the corrected local wind speed is determined based on the baseline and upgraded polynomial functions developed for the first wind turbine.

16. The method of claim 14, further comprising determining a delta wind speed transfer function based on the baseline and upgraded polynomial functions.

17. The method of claim 12, further comprising:
assessing a performance impact provided to the upgraded first wind turbine; and
determining whether to upgrade the second wind turbine based on the assessment of the performance impact provided to the upgraded first wind turbine.

18. A method for assessing the performance impact of wind turbine upgrades, the method comprising:
determining, with a computing device, a baseline power curve for a wind turbine prior to the wind turbine being upgraded;
determining a baseline wind speed transfer function for the wind turbine prior to the wind turbine being upgraded using a polynomial regression analysis, the baseline wind speed transfer function being defined as a baseline polynomial function relating a reference wind speed to a local wind speed for the wind turbine;
controlling an operation of the wind turbine after the wind turbine is upgraded while collecting data associated with the reference wind speed and the local wind speed for the wind turbine after being upgraded;
determining an upgraded wind speed transfer function for the wind turbine after the wind turbine is upgraded using a polynomial regression analysis, the upgraded wind speed transfer function being defined as an upgraded polynomial function relating the reference wind speed to the local wind speed for the wind turbine measured after the wind turbine is upgraded;
determining a corrected local wind speed for the wind turbine based on the baseline and upgraded polynomial functions; and
determining an upgraded power curve for the wind turbine based on the corrected local wind speed; and
comparing the baseline power curve directly to the upgraded power curve in order to assess a performance impact provided to the upgraded wind turbine.

19. The method of claim 18, further comprising determining a delta wind speed transfer function based on the baseline and upgraded polynomial functions.

20. The method of claim 18, further comprising upgrading the wind turbine by replacing an existing component of the wind turbine or by installing a new component on or within a component of the wind turbine.

* * * * *